Oct. 12, 1954   R. A. SANDBERG   2,691,608
METHOD OF HARDENING COMPOSITE ARTICLES
Filed Jan. 16, 1951
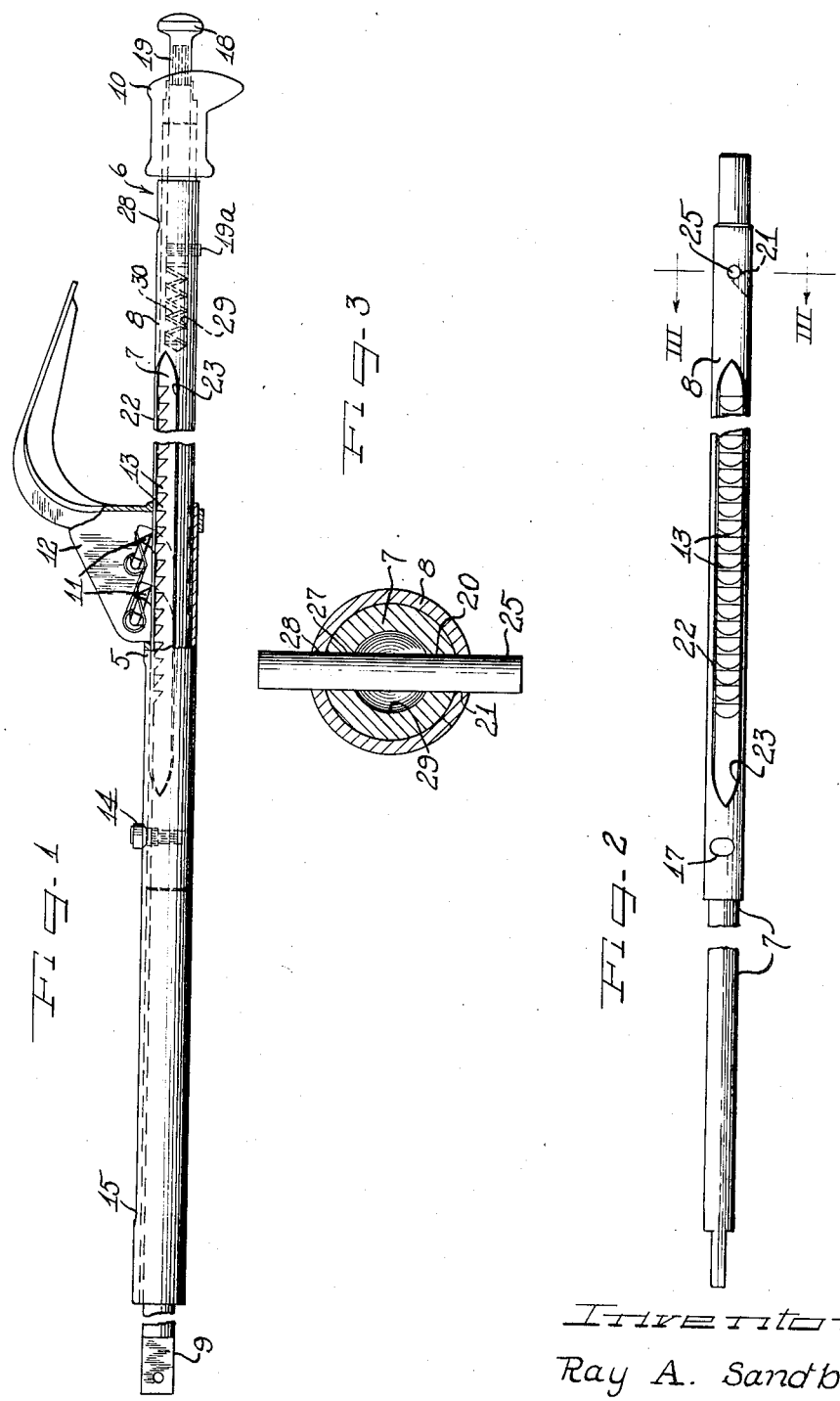
Inventor
Ray A. Sandberg Patented Oct. 12, 1954

2,691,608

UNITED STATES PATENT OFFICE 2,691,608

METHOD OF HARDENING COMPOSITE ARTICLES

Ray A. Sandberg, Waukegan, Ill., assignor to Houdaille-Hershey Corporation, Detroit, Mich., a corporation of Michigan Application January 16, 1951, Serial No. 206,190

3 Claims. (Cl. 148—15.5)

The present invention relates to improvements in the hardening of composite articles or assemblies wherein the members are telescoped in operating assembly and must move relative to one another in operation and must therefore be free from such warpage as would cause binding between the members.

In the manufacture of composite articles or assemblies such as straight pull brake lever assemblies wherein a pull rod and a pawl release sleeve are telescopically related so that the sleeve can rotate or oscillate about the rod for releasing brake setting pawls from ratchet teeth on the surface of the rod, as an incident to release of a brake with which the assembly is associated, a substantial problem has been encountered in hardening the sleeve tube.

A substantial area of the sleeve must be cut out to afford clearance for the ratchet teeth. In consequence, when the sleeve is hardened, the hardening temperatures cause warpage of the sleeve. This has necessitated a special straightening operation in the conventional hardening process where the sleeve is separately hardened and then assembled with the pull rod.

It is therefore an important object of the present invention to provide an improved method of hardening sleeve tubes which are to be assembled in association with a rod structure for service purposes, and according to which method warpage of the tube is avoided during hardening.

Another object of the invention is to provide a novel method of simultaneously surface or case hardening sleeve and rod assemblies in their operationally cooperative relationship.

A further object of the invention is to provide an improved method of selectively hardening an area of a member to be case hardened.

Other objects, features and advantages of the present invention will be readily apparent from the following detailed description of a preferred embodiment thereof taken in conjunction with the accompanying drawings wherein:

Figure 1 is a fragmental side elevational view of a straight pull brake lever assembly embodying structure case hardened according to the method of the present invention;

Figure 2 is a fragmental top plan view of a rod and sleeve assembly of the kind which are used in a brake lever assembly according to Fig. 1 and representing a composite structure or assembly especially susceptible to the present method of hardening; and Figure 3 is an enlarged transverse sectional view taken substantially on the line III—III of Fig. 2.

In a straight pull brake lever as shown in Fig. 1, an elongated tubular support 5 slidably reciprocably supports a cylindrical brake setting mechanism 6 comprising an elongated cylindrical pull rod 7 extending through a sleeve member 8 which provides the bearing for the rod 7 within the tubular guide member 5. At its forward end portion the pull rod 7 is provided with a flattened section 9 which is adapted to be attached a brake setting cable. At its rear end the pull rod carries a handle 10. By pulling rearwardly on the handle 10, the pull rod is moved in a brake setting direction and a set of retaining pawls 11 carried by a pawl supporting structure 12 on the guide member 5 operates to engage ratchet teeth 13 disposed in longitudinal series on a portion of the periphery of the pull rod 7 to retain the pull rod in brake setting position. The pull rod 7 is retained against rotation by means of a pin 14 carried by the rod 7 and projecting radially therefrom to extend through a longitudinal slot 15 in the wall of the tubular member 5. The pin extends through a transverse peripheral slot 17 in the forward end portion of the sleeve 8 and thereby holds the sleeve against longitudinal displacement relative to the rod 7.

For releasing the pawls 11 from the ratchet teeth 13 when it is desired to release the brake, a button 18 exposed at the rear end of a plunger 19 is pressed forwardly to move the plunger slidably through the handle 10 and the rear end portion of the rod 7. This actuates a motivating pin 19a projecting radially from the plunger 19 and from the rod 7 through a longitudinal slot 20 and engaging cammingly in a spiral slot 21 in the sleeve 8. Hence, as the plunger 19 moves forwardly, it causes the sleeve 8 to turn to drive an edge 22, defining one side of an elongated pawl-clearing cut-out or slot 23 in the sleeve 8, into kick-out relation to the pawls 11 to lift the pawls from the ratchet teeth 13 so that the pull rod assembly 6 can slide forwardly to release the brake. This relationship is shown in Fig. 1.

It will be understood, of course, that for satisfactory service, the ratchet teeth 13 must be of substantial hardness so that they will withstand wear incident to ratcheting of the pawls 11 and will successfully withstand operating thrust against the pawls 11. Also, at least the edge 22 of the sleeve 8 which engages the pawls to lift and disengage the same from the ratchet teeth must be of substantial hardness or it will soon be chewed and gouged badly by the relatively hard pawls 11 against which the kick-out edge is forced to release the pawls.

Inasmuch as it is highly desirable for fabrication purposes to make both the rod 7 and the sleeve 8 from an easily workable material such as low carbon steel, it becomes necessary for durability in operation to harden the surfaces of these components of the brake lever assembly which are subject to wear of a character which the relative softness of the original material will not adequately withstand. A desirable hardening expedient comprises case hardening the components of the assembly. The cyanide process of case hardening has been found preferable.

In the case hardening process, the member to be hardened is immersed for a period of time necessary to effect the degree of surface hardening desired in a hot cyanide bath in which the fluid may be either a liquid or a gas of substantial temperature such as from 1500° F. to 1560° F. In the conventional process each article or element is separately hardened. With respect to the pull rod 7, this has been found to be satisfactory and the rod remains reasonably free from distortion. With the sleeve 8, however, a problem has been encountered in that because of the fairly large size pawl-clearing slot or cut out 23, the high temperatures of the hardening bath cause warpage of the sleeve in that section having the cut out 23. It has therefore been necessary to subject the sleeve 8 to a straightening process following the hardening thereof, otherwise assembly of the sleeve upon the rod 7 either cannot be effected or if effected will result in a binding relationship instead of a free sliding relationship.

According to the present invention, advantage is taken of the discovery that where the sleeve 8 is assembled with the rod 7 prior to hardening of at least the sleeve and, for reasons of economy, prior to hardening of either the sleeve or the rod, and then both the sleeve and the rod are hardened simultaneously while in assembly, warpage of the sleeve is minimized. Therefore, prior to hardening, the rod 7 and the sleeve 8 are telescopically assembled into the relationship they will assume in the brake lever assembly. That is, the sleeve 8 is disposed on the rod 7 in the longitudinal and rotary relationship which is found in the completed brake lever assembly when the sleeve and rod are in normal relationship wherein the ratchet teeth 13 are fully exposed through the clearance slot or opening 23 in the sleeve 8, as shown in Fig. 2. Since actually the only surfaces of the sleeve and of the rod that require hardening are the surfaces containing the ratchet teeth 13 on the rod and the surfaces defining the kick-out edge 22 of the sleeve, and also secondarily the external surface of the sleeve 8 which acts as a bearing for the actuating assembly 6 within the guide tube 5, it will be apparent that when the composite is hardened every surface of both of the members that requires hardening will be adequately surface or case hardened. Those surfaces of the composite which are relatively shielded from the hardening bath, namely the internal surface of the sleeve 8 and the surfaces of the rod 7 which are shielded by the encompassing sleeve 8 receive no appreciable wear in service and therefore actually do not require hardening.

In order to retain the rod 7 and sleeve 8 in the desired assembled relationship during the hardening process, they are pinned together by means of a pin member 25 (Fig. 3) extending through the registering slot 20 in the rod and the opening 21 in the sleeve at one side of the assembly and through coaxial and registering apertures 27 and 28 in respectively the rod and the sleeve at the opposite side of the assembly and at the opposite side of a longitudinal blind end bore 29 in the end portion of the rod within which the plunger 19 is slidable and within the bottom of which a plunger return spring 30 is seated in the brake lever assembly. By preference the pin 25 projects to a substantial extent to opposite sides of the assembly so as to serve as a suspension support engageable by hanger means by which the composite is suspended in the case hardening cyanide bath.

After the hardening process has been completed, the sleeve and rod are retained in the same assembly, minimizing any straightening that may be required on a percentage of parts carried through in large quantities. Thus, substantial economies are effected in manufacture, not only in the straightening of the sleeve 8, but separate handling of the rod and sleeve components for hardening purposes is eliminated.

Apparently important factors in attaining the improved and very desirable results of the present invention include the fact that the rod 7 serves as a mandrel for the sleeve 8 during the hardening process and thereby resists any tendency toward consequential warping of the tube or sleeve. In addition, since only the external and exposed surfaces of the sleeve 8 are actually subjected to the hardening temperatures and materials, any tendency toward warpage is quite appreciably minimized.

The invention also provides a convenient method of selectively hardening a selected area of a rod, such as the ratchet teeth area of the pull rod.

It will be understood that modifications and variations may be effected without departing from the scope of the novel concepts of the present invention.

I claim as my invention:

1. A method of hardening a straight pull brake lever rod having a series of ratchet teeth longitudinally thereon and a pawl release sleeve having longitudinal teeth exposing an opening therein and a pawl kick-out edge along one side of said opening, the steps of assembling the sleeve on the rod in a sliding fit relation, pinning the sleeve and rod to maintain the sleeve in position on the rod to expose the ratchet teeth through the opening in the sleeve, and then subjecting the sleeve and rod simultaneously to a surface-hardening bath at surface hardening temperatures to surface harden the exposed portion of said rod and said sleeve without deformation of said sleeve.

2. The method of case hardening the external surface of a sleeve member having an open portion on the surface of the sleeve intermediate the ends thereof and a preselected portion of a rod member having a sliding fit and extending through said sleeve which portion is exposed by the opening in the surface of the sleeve comprising assembling the sleeve on the rod member substantially closing the opening in the surface of the sleeve and exposing a preselected portion of the rod member, subjecting the assembled sleeve and rod member to a hardening fluid at hardening temperature for a preselected time and thereafter quenching said assembled sleeve and rod member to case harden the exterior of said sleeve and said preselected portion of said rod member substantially without deformation of said sleeve.

3. The method of hardening the external surface of a sleeve member having an open portion on the surface of the sleeve intermediate the ends thereof and a preselected tooth portion of a rod having a sliding fit and extending axially through said sleeve which tooth portion is exposed by the opening in the surface of the sleeve comprising assembling the sleeve on the rod member substantially closing the opening in the surface of the sleeve and exposing the preselected tooth portion of the rod member, subjecting the assembled sleeve and rod member to a hardening fluid at hardening temperature for a preselected time and thereafter quenching said assembled sleeve and rod member to case harden the exterior of the sleeve and said preselected portion of said rod member substantially without deformation of said sleeve.

References Cited in the file of this patent

UNITED STATES PATENTS

| Number | Name | Date |
|---|---|---|
| 2,014,612 | Borton | Sept. 17, 1935 |
| 2,197,039 | Gottlieb | Apr. 16, 1940 |